UNITED STATES PATENT OFFICE.

RUSSELL S. PENNIMAN AND JOHN C. SCHRADER, OF DOVER, NEW JERSEY, ASSIGNORS TO THE ATLANTIC DYNAMITE COMPANY, THE REPANNO CHEMICAL COMPANY, AND THE HERCULES POWDER COMPANY.

DYNAMITE.

SPECIFICATION forming part of Letters Patent No. 333,150, dated December 29, 1885.

Application filed January 22, 1885. Serial No. 153,610. (No specimens.)

*To all whom it may concern:*

Be it known that we, RUSSELL S. PENNIMAN and JOHN C. SCHRADER, both of Dover, in the county of Morris and State of New Jersey, have invented certain new and useful Improvements in High Explosive Compounds; and we do hereby declare that the following specification is a clear, true, and complete description of our invention.

Explosive compounds embodying our invention differ from all others, in that they not only contain absorbent composite grains composed of combustible matter and charged with the liquid explosive, but also contain grains of combustible gas-producing matter which do not contain said liquid explosive, and are jacketed or coated with a material for which nitro-glycerine has not affinity.

One object sought and attained by our invention is a highly-effective nitro-glycerine compound which will not harden at low temperatures, because the nitro-glycerine grains, however heavily charged they may be, are practically kept from contact with each other, and therefore cannot be adhesively united by freezing.

Another object is to enable such compounds to be highly effective, by employing with the nitro-glycerine grains other grained gas-producing material which will, when fired by the nitro-glycerine grains, afford a high explosive force; and still another object is to enable the charged grains to retain their liquid explosive, because we employ other grains therewith, which, being coated or jacketed, cannot and will not take up or absorb the liquid explosive.

Our compounds in their best form embody grains of nitrate of ammonia, which are protected by soft or viscous jackets or coatings and combustible absorbent grains, within which effective quantities of nitro-glycerine are housed and carried.

In the attainment of the ends stated we prefer to employ a combustible porous or cellular dope which was invented by John C. Schrader, and constitutes the subject of his application for Letters Patent Serial, No. 133,235.

For the purposes of this specification we will state that the said dope is in granular form, and that each grain thereof is composed, in part, of a cellular mass of sulphur, and said sulphur is combined with such combustible matter as coal, woody or vegetable fiber, and nitrates, and the grains are of such size that they can take up and carry within them as high as, say, fifty per cent. of their weight in nitro-glycerine. The characteristic feature of this dope is that the sulphur is employed in such proportions to the other solid matters that when melted and then cooled it forms in each grain a cellular or porous structure—as, for instance, in one variety of dope we employ sixteen parts sulphur, twelve parts bituminous coal, and seventy-two parts nitrate of soda, and in another variety twenty parts sulphur, twelve parts wood pulp, and sixty-eight parts nitrate of soda. We prefer, however, for our present purposes to employ a dope containing coal or other solid bituminous matter, it being understood that the grains of dope are of sufficiently large size to enable them to house and securely carry as high as, say, fifty per cent. of nitro-glycerine, as before stated. Other varieties of grained "dope" may, however, be employed without departure from our invention—as, for instance, such as are produced by the well-known wet processes, after the manner of making black blasting-powder, but without compression or glazing, so as to produce grains with good absorbent capacity. In such dopes charcoal is employed, while by the hot process, before referred to, bituminous coal can only be relied upon, because of the high temperatures involved.

A good charcoal dope can be produced by wet grinding, say, ten parts of sulphur, fifteen parts of charcoal, and twenty-five parts of nitrate of soda, and then graining the mass by well-known mechanical and drying operations.

With absorbent grains of the general character stated we combine grains of nitrate of soda or of nitrate of ammonia, or any other of the explosive salts, the novelty of the use of such salts in our compound consisting in the fact that each grain thereof is jacketed or coated with a film of matter which has no affinity for the nitro-glycerine, and hence enabling the latter to be retained within its grains, and preventing it from being absorbed by the grains of explosive salt. For producing a compound embodying our invention in its best form, we combine with said charged grains nitrate of ammonia in grains much smaller than the dope, and thereby render the resultant mass not only of greater specific gravity, but of greater explosive force than the charged dope alone.

Broadly stated, it is new, as we believe, to combine nitrate of ammonia in any form with any form of composite grains in which nitro-glycerine is actually housed. It is also broadly new to combine with absorbent composite grains charged with nitro-glycerine jacketed grains of nitrate of soda or nitrate of ammonia, or any other explosive salt. If the salts used be not deliquescent in their character, the jackets or coatings on the grains thereof perform only the function of preventing said grains from robbing the charged grains of portions of the liquid explosive; but with the nitrate of ammonia said jacket or coating also securely protects the grains thereof against deliquesence, and also protects them in such a manner that they will not lose their granular character, which is necessary for enabling them to be freely and evenly mixed with the large composite grains which are charged with the liquid explosive, and to properly occupy and fill the intervening spaces; and it is also necessary that said grains of nitrate of ammonia should have a protecting-coating which will enable it to be mixed with the hard composite grains without danger of removing or so impairing said coating as to expose the nitrate to the atmosphere, and therefore said grains of nitrate of ammonia should be housed within a soft and viscous envelope, and we prefer to use what is known as "Penniman's protected nitrate of ammonia," and is described in R. S. Penniman's application for Letters Patent, Serial No. 113,217 and, which, for the purpose of this specification, may be described as carefully-dehydrated nitrate of ammonia in a granular condition, and in its best form coated with some one of the well-known soft educts or products of petroleum—as, for instance, to every one hundred pounds of the granulated nitrate of ammonia from eight to twelve pounds of cosmoline is added and the mass carefully mixed.

It is to be understood that our present invention is in no manner limited to any particular proportion of nitro-glycerine.

For producing another specially desirable compound, we first charge thirty parts of the coarse absorbent composite grains with an equal weight—i. e., thirty parts—of nitro-glycerine. If properly worked, there will be no free nitro-glycerine, but all of it will be well housed in the absorbent grains. To sixty parts of these charged grains we then add forty parts of the protected nitrate of ammonia in fine grains and thoroughly mixed. The liquid explosive will have no tendency to unite with the soft coating of the nitrate grains, and the abrasion of the charged grains against the protected grains of nitrate will not materially impair their coating. The compound thus produced, although containing but thirty per cent. of nitro-glycerine, will be equal in effective force to and can be relied upon under all circumstances as fully as any prior compound known to us embodying as high as seventy-five per cent. of nitro-glycerine and under the average market prices of the several materials and of labor, our compound can be produced at about three-quarters of the cost of any of said prior compounds containing seventy-five per cent. of nitro-glycerine.

For producing one of our compound having an effective force equal to any prior compound containing fifty per cent. of nitro-glycerine, we take of the absorbent composite grains forty-two (42), parts and charge them with twenty-four (24) parts of nitro-glycerine. In this case the composite grains may be smaller than in the first instance, because each grain is to house a lesser proportion of the liquid explosive, and to the grains thus charged we add thirty-four (34) parts of the protected nitrate of ammonia. This compound can be produced at about five-sixths of the cost of any compound known to us containing fifty per cent. of nitro-glycerine.

For producing a still lower grade of our compound—say equal to the best compound known to us containing forty (40) per cent. of nitro-glycerine—we charge fifty-two and one-half (52½) parts of the composite grains with seventeen and one-half (17½) parts of nitro-glycerine. This small proportion of the liquid explosive enables us to use smaller composite grains than those previously referred to. To grains thus charged we add thirty parts of the protected nitrate of ammonia. This compound can be produced at a cost of about four-fifths of the cost of the best compound known to us containing forty per cent. of nitro-glycerine.

Still lower grades of our compound can be produced within our invention, the gist of which consists in housing the nitro-glycerine in combustible absorbent composite grains, and then compounding the same with grains of explosive salts, which are jacketed or coated, so that the charged grains will not be robbed of their contents, and also so that said charged grains will be separated from each other and prevented from adhering in mass when frozen. If grained nitrate of soda be used in lieu of the nitrate of ammonia, it is in like manner coated or jacketed.

We are aware that it has been heretofore proposed to employ a protecting agent with the nitrates of ammonia and of soda in nitro-glycerine compounds—as, for instance, in the English Letters Patent of Nobel No. 1,570 of A. D. 1873, wherein it was proposed to grind paraffine with nitrate of soda, or nitrate of ammonia and charcoal, and to mix the resulting mass with from eighteen (18) to twenty (20) per cent. of nitro-glycerine; also in the English Letters Patent of Hinde, (Sjoberg,) wherein nitrate of ammonia and one-quarter of one per cent. of palmitinate of cetyl are described as components in a mixture also containing carbonate of lime, bicarbonate of soda, charcoal, and nitro-glycerine; also, that the English provisional specification No. 2,420 of A. D. 1876, suggests, in a general way, the use of nitrate of ammonia in explosive compounds, and the protection of the nitrate by the use of melted stearine or paraffine, or other similar bodies. None of these prior compounds contained composite grains charged with nitro-glycerine, and no jacketed grains of explosive salts, both of which must be present in any compound embodying our invention.

In the use of the term "composite grains" it is to be understood that we include only such grains as contain two or more component parts, and are specially formed into absorbent grains, as distinguished from such a finely-grained mass of various components as is, for instance, described in the hereinbefore-mentioned British Letters Patent of Nobel, No. 1,570, of A. D. 1873.

Having thus described our invention, we claim as new and desire to secure by Letters Patent—

An explosive compound, substantially as hereinbefore described, composed of composite absorbent grains charged with nitro-glycerine, and jacketed grains of an explosive salt, whereby the grains which are charged with nitro-glycerine will not be robbed of their contents by the grains of explosive salt, and also whereby said charged grains will be kept from contact with each other, for preventing adhesion when frozen, as set forth.

RUSSELL S. PENNIMAN.
JOHN C. SCHRADER.

Witnesses:
 WM. S. WHITE,
 JAS. H. NEIGHBOUR.